A. HENLEY.
NUT LOCK.
APPLICATION FILED APR. 19, 1919.
1,323,187. Patented Nov. 25, 1919.
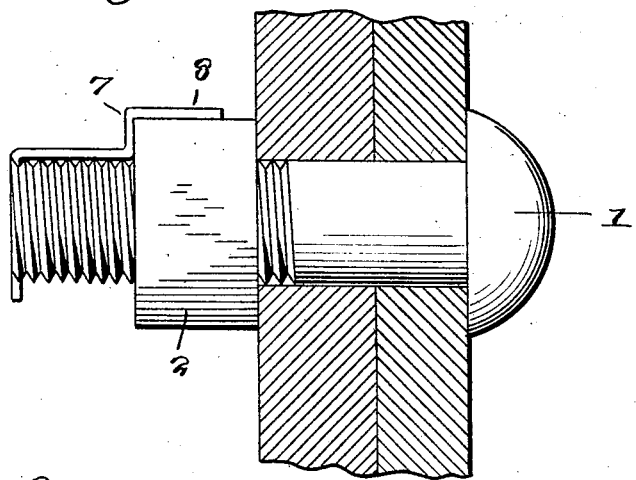
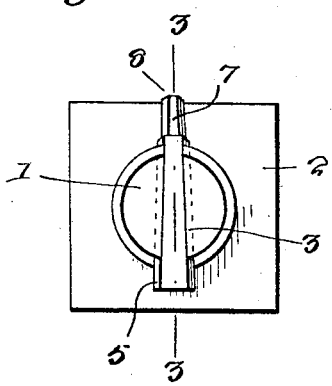
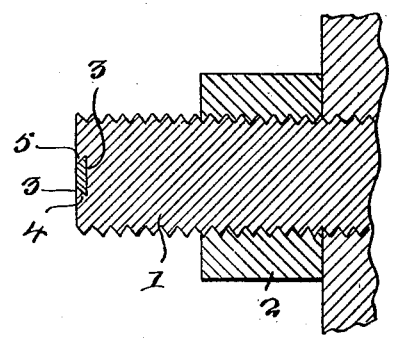
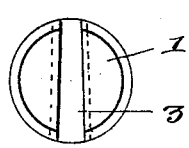
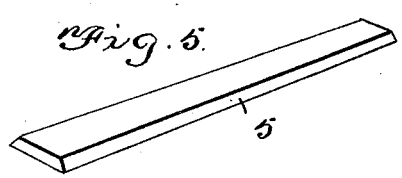
Inventor
Albert Henley
By Victor J. Evans
Attorney
Witnesses
E. R. Ruppert

UNITED STATES PATENT OFFICE.

ALBERT HENLEY, OF RURAL, ALABAMA.

NUT-LOCK.

1,323,187.  Specification of Letters Patent.  Patented Nov. 25, 1919.

Application filed April 19, 1919. Serial No. 291,232.

*To all whom it may concern:*

Be it known that I, ALBERT HENLEY, a citizen of the United States, residing at Rural, in the county of Clarke and State of Alabama, have invented new and useful Improvements in Nut-Locks, of which the following is a specification.

This invention has reference to means for preventing the unscrewing of a nut from a bolt.

The object of the invention is to produce an extremely simple but thoroughly efficient device for this purpose.

Other objects and advantages will present themselves as the nature of the invention is better understood, reference being had to the accompanying drawings, in which:

Figure 1 is a side elevation illustrating a nut locked on a bolt in accordance with this invention.

Fig. 2 is a front elevation thereof.

Fig. 3 is a sectional view approximately on the line 3—3 of Fig. 2.

Fig. 4 is a view of the outer end of the bolt.

Fig. 5 is a view of the locking member.

In the drawings a bolt is indicated by the numeral 1, and a nut screwed on the bolt is indicated by the numeral 2. The nut and bolt are of the ordinary construction.

The bolt 1, upon its outer end is provided with a beveled notch 3 extending entirely therethrough and the side walls of the notch are beveled outwardly as at 4.

The locking member is in the nature of a strip of bendable material and has its longitudinal edges gradually decreased in width from one of the ends thereof to the opposite end, and the said longitudinal edges are beveled as at 5. The wedge-shaped bendable locking member is passed through the slot 3, the beveled edges 5 thereof being engaged by the beveled walls 4 of the substantially wedge-shaped notch. When the edges of the locking member are brought into frictional engagement with the beveled side walls of the notch, the member 5 is arranged longitudinally over the bolt and directed toward the nut. The member is then bent against the outer face of the nut as indicated by the numeral 7, and if of sufficient length the said member is bent over one of the sides of the end as indicated by the numeral 8. It will be apparent that the nut may be screwed any desired distance on the bolt and may be locked at such position by my improvement. Should the locking member be of too great a length the same may be readily severed either by hammering the same against one of the corners of the end or by a suitable cutting implement, and it is thought, from the foregoing description, when taken in connection with the drawings, the simplicity of the construction and the advantages thereof will be readily apparent.

Having thus described the invention, what is claimed as new, is:—

A bolt and a nut screwed on said bolt, said bolt having its outer end provided with a wedge-shaped notch the side walls of which being beveled outwardly, a bendable locking member wedge-shaped in plan and having its edges beveled and designed to be received in the notch and to frictionally engage with the side walls thereof, said member designed to be bent longitudinally over the bolt and further bent to contact with the nut.

In testimony whereof I affix my signature.

ALBERT HENLEY.